United States Patent
Buchel

(10) Patent No.: US 7,132,459 B1
(45) Date of Patent: Nov. 7, 2006

(54) MOULDED BODIES MADE FROM A POLYURETHANE MATERIAL, PRODUCTION AND USE THEREOF

(76) Inventor: Thomas Buchel, Duxweg 14, FL-9494 Schaan (LI)

( * ) Notice: Subject to any disclaimer, the term of this patent is extended or adjusted under 35 U.S.C. 154(b) by 0 days.

(21) Appl. No.: 09/807,457

(22) PCT Filed: Oct. 15, 1998

(86) PCT No.: PCT/EP98/06558

§ 371 (c)(1),
(2), (4) Date: Jun. 11, 2001

(87) PCT Pub. No.: WO00/23493

PCT Pub. Date: Apr. 27, 2000

(51) Int. Cl.
 C08J 9/04 (2006.01)
 C08G 18/67 (2006.01)
 C08L 75/14 (2006.01)
 C08F 2/46 (2006.01)
 C08F 2/48 (2006.01)

(52) U.S. Cl. ............ 521/170; 521/50.5; 522/90; 522/174; 525/453; 528/75

(58) Field of Classification Search ............ 528/75; 522/90, 174; 525/453; 521/170, 50.5
See application file for complete search history.

(56) References Cited

U.S. PATENT DOCUMENTS

| | | | | |
|---|---|---|---|---|
| 4,073,828 A | * | 2/1978 | Ferrarini et al. | 524/590 |
| 4,129,641 A | * | 12/1978 | Ferrarini et al. | 264/294 |
| 4,250,005 A | | 2/1981 | Lamplugh | 204/159.15 |
| 4,287,116 A | * | 9/1981 | Burns | 524/452 |
| 4,787,850 A | | 11/1988 | Michl et al. | 433/201.1 |
| 5,254,604 A | * | 10/1993 | Mori et al. | 522/95 |
| 5,286,832 A | * | 2/1994 | Verleg et al. | 528/75 |
| 5,609,806 A | * | 3/1997 | Walsh et al. | 264/136 |
| 6,114,402 A | * | 9/2000 | Smith | 521/117 |

FOREIGN PATENT DOCUMENTS

| | | |
|---|---|---|
| DE | 3127945 | 1/1983 |
| EP | 0262488 | 4/1988 |
| EP | 0269071 | 6/1988 |
| GB | 1512553 | 6/1978 |

* cited by examiner

*Primary Examiner*—Rabon Sergent
(74) *Attorney, Agent, or Firm*—Ostrolenk, Faber, Gerb & Soffen, LLP

(57) ABSTRACT

The invention relates to a method for the production of polyurethane-based technical formed parts, commodity goods and objects, preferably consisting of (meth)acrylate containing isocyanate and hydroxy groups and at least 0.5 mMol/g reactive double bonds that can be determined using a DSC method. In a first step, a mixture of all starting constituents is produced and given a desired form using methods such as casting, pressing, rolling or extruding that are known per se in plastic engineering technology, whereby said mixture simultaneously or subsequently undergoes a non-radically triggered polyaddition reaction (urethane reaction) and a polyurethane substance is created in the form of a flexible, optionally elastic pre-form that can be deformed without any removal of said material. In a second step, the pre-form undergoes preferably mechanical shaping in addition to substantially emission-free hardening by means of radical polymerization of the free double bonds. The invention also relates to products that are manufactured using this method in addition to multiple applications thereof, such as directly in the place where they are used, in order to produce highly resistant shaped bodies and composite elements that can be used more particularly in fields such as medicine (e.g. surgery, orthopaedics, dental medicine), technology (e.g. civil engineering, the construction industry, motor vehicle production, insulation technology, measuring and lighting technology), the home, cosmetics and fine art.

42 Claims, No Drawings

MOULDED BODIES MADE FROM A POLYURETHANE MATERIAL, PRODUCTION AND USE THEREOF

TECHNICAL FIELD

The invention refers to a flexible, optionally elastic mouldable material on the basis of polyurethane (PU) that can be converted to a stable final form by subsequent curing, the material containing a polyurethane matrix having a plurality of reactive double bonds and particularly of ethylene-type unsaturated, radical-polymerisable groups present in a chemically bound form as part of the polyurethane matrix, for instance as an acrylic acid or acrylic acid derivative. The invention further relates to a process for producing cured moulded articles from this material and their use.

STATE OF THE ART

From the European patent document EP 0 262 488 the contents of which shall herewith be held to be included in the present specifications, a novel reactive organic filler in the form of a solid powder for polymerisable compositions is known which consists of a polyurethane material distinguished by a high content of reactive double bonds and which together with the components of the matrix to be filled, yields a durable compound between filler and matrix, particularly via copolymerisable groups. After complete polymerisation, products are thus obtained which have substantially improved crack resistance, strain resistance, and abrasion resistance. Such compositions have applications in diverse technical fields; they have attained particular significance as dental materials. The term of dental materials is understood to include dental fillings for conservative dental treatments and materials for the production of artificial teeth or parts of teeth such as crowns or inlays.

This polyurethane material which, in diverse modifications, is used as well in the present invention is generally crystal clear and is produced through a reaction not triggered by radicals. In addition it contains at least 0.5 mmole, preferably 0.5 to 5 and particularly 1.4 to 2.6 mmole of reactive double bonds per gramme of the polyurethane matrix (as determined by differential scanning calorimetry, DSC; details of this method are described in EP 0 262 488) which preferably are present as structural components of the polyurethane matrix and hence cannot be extracted with solvents.

In the following, the term "reactive double bonds" is to be understood primarily so as to include the double bonds that can be determined with the DSC method (see EP 0 262 488), unless another definition is specified in detail or another interpretation can be deduced from the context.

The high content of reactive double bonds that cannot be extracted is attained by polymerisation and cross linking of the starting components—preferably isocyanates as well as acrylates containing hydroxyl groups, particularly hydroxy (meth)acrylates—by a reaction not triggered by radicals, i.e., essentially by a polyaddition reaction (in the following also called the "urethane reaction"), so that 75 to 90% of the ethylene-type unsaturated double bonds contained in the starting monomers are still present in the fully polymerised PU material. This feature allows the material to be subjected to a curing by radical-type polymerisation at any given time, for instance after intermediate storage.

The PU material which is employed as well for the purposes of the present invention is produced according to EP 0 262 488 by reacting (meth)acrylates containing hydroxyl groups with isocyanates while having a ratio of OH to NCO groups of approximately 1:1, and where at least one of the starting components is trifunctional or more highly polyfunctional in order to attain the degree of cross linking required for the different applications. According to a particularly favourable composition, a tri or polyisocyanate is used as the starting component, in which case the possibility arises to use less than the stoichiometric amount of hydroxy(meth)acrylate and achieve the required cross linking with water and/or a polyol, for instance an aliphatic triol, which react with the unreacted isocyanate groups forming urea or urethane groups. On the other hand one can also react a (meth)acrylate having three or more hydroxyl groups with a diisocyanate. Details of this way of preparation are known from EP 0 262 488.

Examples of suitable hydroxyl-functional (meth)acrylates are: bis(methacryloxy-2-hydroxypropyl) sebacate, bis (methacryloxy-2-hydroxypropyl) adipate, bis(methacryloxy-2-hydroxypropyl) succinate, bis-GMA (bisphenol A-glycidyl methacrylate), hydroxyethyl methacrylate (HEMA), polyethylene glycol methacrylate, 2-hydroxy and 2,3-dihydroxypropyl methacrylate, and pentaerythritol triacrylate.

Preferred isocyanates are aliphatic compounds such as 3-isocyanatomethyl-3,5,5-tri-methylcyclohexyl isocyanate, trimethylhexamethylene diisocyanate as well as the triisocyanate tris(6-isocyanatohexyl)biuret (Desmodur® N 100 of Bayer AG).

It is further known from EP 0 262 488 that the reaction between the hydroxy-(meth)acrylates and isocyanates can occur under mild conditions. The temperature is preferably about 10 to 60° C. A catalyst can be added for acceleration; tertiary amines and organometal salts are suitable amongst others. Even the reaction of hydroxyl-functional (meth) acrylates is already known per se. It is employed for instance to produce prepolymers usable as binders in dental materials (cf. DE-OS 2 126 419).

According to EP 0 262 488, the PU material can also be produced by ionic copolymerisation of hydroxy(meth)acrylates with an epoxy resin and/or trioxane in stoichiometric ratios. For instance, bisphenol A-diglycidyl ether (Epikote® 828) can be reacted with glycidyl methacrylate and/or HEMA using $BF_3$ as a catalyst. Similar results are obtained when reacting glycidyl (meth)acrylate with trioxane or epoxides with epoxy(meth)acrylates. Further examples are the reaction of hydroxyl compounds with carboxylic acid derivatives to polyesters (at least one of the starting components containing (meth)acrylate groups) and the reaction of allylidenes, for instance diallylidene pentaerythritol, with alcohols or carboxylic acids. In these reactions, too, the ethylene-type unsaturated vinyl groups remain unchanged and are available as reactive groups for later radical-type polymerisation performed for the purposes of curing.

DESCRIPTION OF THE INVENTION

It has now surprisingly been found that, depending on the preparation conditions, shape and thickness, this polyurethane material when produced according to EP 0 262 488, mostly in the form of lumps reinforced with silylated $SiO_2$, subsequently to be comminuted to a powder and used as a filler, is more or less flexible, often even elastic, and mechanically mouldable without removal of material. Thus, it has been found amongst other details that this polyurethane material can be produced in the form of film, tape, ribbon, cord, and strand, and also in the form of whatever articles, formed parts or consumer items which within certain limits—depending on the particular chemical composition of the polyurethane matrix and the chosen product shape—can be formed by methods such as bending, twisting, pressing, rolling, and the like. Given the great number of reactive double bonds, and particularly of ethylene-type unsaturated, radical-polymerisable groups present in this material in a chemically bound form as part of the polyurethane matrix, for instance as an acrylic acid or an acrylic acid derivative, a subsequent processing by a combination of mechanical shaping and physicochemical curing is possible.

It is now the task of the present invention to indicate ways to provide this material in a suitable form and produce moulded bodies of any desired shape from it. In fact, contrary to EP 0 262 488, according to the present invention the PU material is not taken as a lump from the reaction vessel after the polyaddition reaction, and then comminuted to powder by grinding, but PU preforms which are more or less flexible, as desired, optionally even plastic, are produced in the non-powder form predetermined and desired for any given application, for instance in the shape of specific formed parts, of consumer items or decorative items intended to be immediately used as such, or in the form of specific three-dimensional structures, preferably as (endless) tape, ribbon, film, strand, profiles etc. to be further processed by mechanical methods, particularly without removal of material, and/or by curing through radical polymerisation.

The term "preform" or "PU preform" is to be understood in the following to cover those products of a specific object form (that is, excluding the form of powder) which consist of the PU material that is present after the completed polyaddition reaction and contains the minimum concentrations of reactive double bonds defined at the outset and present in a chemically bound form that cannot be extracted. The PU preforms can already be used as such for certain applications, or subjected to subsequent shaping, particularly mechanical, with or without removal of material and simultaneous or subsequent radical-induced curing. The resulting final, cured products are summarily designated in the following as "moulded bodies" or "moulded PU bodies" unless the context provides a different interpretation.

It is a task of the invention, therefore, to describe how by twisting, bending, rolling, deep-drawing or similar mechanical actions the reactive polyurethane material can be brought into a desired shape, and is subsequently stabilised and cured in this shape by radical polymerisation via the reactive double bonds.

According to the invention, the reactive unsaturated groups are present as direct, nonextractable chemical components of the polyurethane backbone, but a PU material with similar properties can basically be produced as well by admixing at least some part of these reactive groups in the form of acrylic acid or acrylic acid derivatives to the polyurethane matrix, or occlude them by this matrix. Such an inclusion will for instance occur when the acrylate component is used in an excess over the isocyanate component, and becomes occluded during the non-radical-type polymerisation reaction (polyaddition) by the developing polyurethane matrix. The PU material can also be swelled afterwards by addition of (meth)acrylates, for instance monometh-acrylates (MMA).

However, whenever the monomers of the starting mixture are reacted with each other in the stoichiometric ratio, the PU material will be practically free of residual, unreacted monomers, which can be seen from the fact that the double-bond content cannot be reduced by solvent extraction.

By a deliberate choice of the starting monomers, both the flexibility of the preforms and the physical properties, particularly the strengths, of the radical-polymerisation-cured final products can be controlled. The longer the chains of the starting monomers introduced, the more elastic will be the resulting preform, but the lower will on the other hand be the mechanical strength parameters of the definitely cured moulded bodies after radical polymerisation.

It is now the great advantage of the present invention that the PU material present, for instance, in a flat shape such as a film, a tape, or a ribbon, can be used in an extraordinary diversity of ways, and can be brought into the desired shape and definitely cured at the point of use. For instance, in medical practice it can be used to restrain or firmly splint within a few minutes injured limbs by partial or complete enveloping with such a film and subsequent curing by a curing reaction preferably induced by light and particularly by blue light or UV. The half-shells of such splints can also be fashioned directly on the patient. This has the advantage over a traditional plaster cast that eventual pressure spots or other, undesired concomitant symptoms or processes become visible from outside, since the material is transparent, and thus early remedies can be applied. Relative to plastic compositions shaped or cured by heat, the present invention has the great advantage that high temperatures not tolerated by the skin do not arise.

It is a further advantage of the invention that in many applications and particularly in medical or orthopaedic applications of the PU material in immediate proximity to the skin or in direct contact with the skin (such as orthopaedic supports, insoles etc.), only materials can be used which contain no free or extractable monomers so that a potential stickiness of the polyurethane material that otherwise may arise is avoided and that, above all, it is prevented that substances possibly irritating or toxic to the skin are given off or inhaled.

For certain applications where sufficient air permeability of the PU preforms or definitely cured moulded PU bodies must be secured, for instance in replacements for plaster casts or other dressings, the PU material is produced in an air-permeable form, with processes for air-permeable foaming or subsequent perforation of the PU preforms being preferred. Methods for the production of foamed plastics, for instance by the addition of foaming agents or by expansion under decompression, as well as methods for a mechanical perforation of plastics are a known state of the art.

According to the invention, another field of applications of the PU material is the production of articles, elements, and medical aids including bone replacement parts in orthopaedics and orthopaedic surgery as well as the production of dental materials.

Because of the advantageous properties of the definitely cured, moulded PU bodies, particularly with respect to their skin compatibility, attainable hardness, mechanical strengths and/or optical properties, the PU material—simple to use, flexible, and where desired elastic—is also advantageous when used for technical purposes in civil engineering and mechanical design. For instance, pipe connections, ways, borders, sheathing, mounting supports, sound and heat insulations, structural elements, components, casts of objects, moulds, optical wave guides, tool components, covers, protective films, and the like can be produced on the spot with it.

It is a particular advantage amongst others, of the process used according to the invention to produce technical formed parts, relative to traditional processes for the production of these and similar formed parts, that after the first step of production according to the invention, that is, after production of the flexible PU material or PU preform, all lowmolecular-weight compounds (monomers) are chemically bound into the polyurethane matrix, and thus are liberated, neither during storage in the form of semifinished product nor during subsequent radical-type curing. Thus, storage, processing and curing occur without emissions and hence can be performed even in locations not equipped with special protective devices such as air-filter installations. The dosing and admixing of special curing agents often practiced in the traditional production for instance of thermoset formed parts also can be dispensed with.

Another essential advantage of the present invention that must be mentioned is the fact that the polyurethane material is also eminently suited for the production of fibre-reinforced composites. To this end it is advantageous to impregnate the fibre materials, particularly loose fibres, nonwoven or woven fabrics of materials such as glass, minerals, carbon or organic polymers, with the liquid starting components prior to the first process step (i.e., prior to the polyaddition reaction), and after that to carry out polyaddition of the reaction mixture containing the impregnated fibre material. In this way a flat, fibre-reinforced polyurethane material can be produced which is not sticky but still flexible enough so that it can be brought into a desired shape and can subsequently be cured to its final strength. By superposition of the flexible, fibre-reinforced polyurethane materials and subsequent thermal and/or photopolymerisation under pressure, composite moulded bodies can be produced in which the layers are chemically bonded amongst each other.

According to the invention, another possibility for the production of fibre-reinforced moulded bodies, particularly multilayer or laminated moulded bodies, from the polyurethane material consists in inserting or incorporating the fibre material only after the polyaddition step between two or more, ordinarily flat blanks or preforms of the polyurethane material, and subsequently polymerising in the heat or under light while applying pressure to generate a definitely cured, fibre-reinforced composite moulded body. During radical polymerisation of the different layers, a homogeneous bonding solidly enclosing the reinforcing fibres develops between the PU preforms. Even complex shapes and components having small or large wall thicknesses can be produced by this method. Such composite moulded bodies can be used wherever traditional composites (fibre composites) can be used, particularly so in motor vehicle and railway construction, shipbuilding, and aircraft construction, but handling of the PU materials or preforms according to the invention is distinctly improved over that of comparable traditional composites (for instance no stickiness, no emission of pollutants).

Another advantage of the present invention that must be mentioned is the fact that the volume decrease or shrinkage occurring during polymerisation reactions of plastics, although it does occur as well in the production processes according to the invention, is substantially less important because of the two-step reaction—first nonradical-type polyaddition, then radical polymerisation—and can be further reduced by the addition of fillers. For instance, a shrinkage of 3% and less can be achieved in this way, depending on the composition of the starting components and on filler content, as compared with about 8% in many traditional plastics polymerisation reactions.

A further advantage of the invention that must be cited is the fact that the PU material and hence also the definitely cured, final product can be adjusted so as to be highly transparent, and in the definitely cured state is very hard and scratch-resistant. The advantages over glass are, amongst others, an improved handling and lower weight of the polyurethane material. Therefore, the PU material, where appropriate fibre-reinforced, is eminently suited also for the production of optical objects such as lenses, headlight glasses, lamp covers, light domes, and covers for solar installations.

Thin films reinforced with endless carbon fibres can further be produced from the PU material, and used as expansion probes. If for instance such a film is glued to a metal beam of a structure, the carbon fibres will tear upon strong elongation of the beam. As the carbon fibres are electroconductive, such an elongation is readily noticed from the resulting circuit interruption, and countermeasures can be initiated before the structure breaks.

By adding powders for instance of aluminium or silver to the PU material, electroconductive films can be produced which can be used in many places, particularly as a protection against electrostatic charge.

According to the invention, mica can be admixed to the starting components and the resulting PU material produced in the shape of insulating tape in order to reinforce the electrical insulating properties of the PU material that anyhow already are present to a large extent. Where required and meaningful, these insulating tapes can also be cured after their stipulated application so that in addition mechanical protection is provided for the insulated part.

Apart from that, the polyurethane material—optionally fibre-reinforced—can of course also be used for the production of everyday utensils, toys, or decorative articles, and even as a material for sculptors, in which case it is primarily the elastic preforms which can be produced in any desired size and bonded with each other that readily submit to processing without the removal of material (for instance pressing, bending, twisting, etc.) as well as to processing with the removal of material (for instance cutting, milling, carving, grinding, scraping etc.).

For a further increase in mechanical strengths such as flexural strength, tensile strength, and compressive strength, the PU material may contain inorganic and/or nonreactive organic fillers which advantageously are added to the reaction mixture prior to the addition reaction. In this way the physical properties of the PU material can be varied within wide limits. The content of inert fillers in the reactive PU material can be between 0 and 80% by weight referred to the total weight of the PU material. Contents of 20 to 75 and particularly of 40 to 70% by weight are favourable for many technical applications.

A large number of inorganic compounds is suitable as fillers. Examples are glass powder, aluminium oxide, silicium dioxide such as quartz, sand or silicic acid, diatomaceous earth, calcium carbonate, clay, talc, pumice, ground slag, mica, asbestos, aluminium sulfate, calcium sulfate, or lithopones. Molybdenum sulfide, graphite, carbon black, fly ash, potassium titanate or fibres such as glass fibres, carbon fibres, or different plastics fibres are also suitable. Glass powder or quartz powder as well as extremely fine silicic acids, particularly microfine fumed, but also precipitated silica are particularly suitable for the attainment of extremely high strengths. Another group of suitable fillers includes representatives such as barium sulfate or rare-earth metal fluorides.

The inorganic filler is preferably superficially silylated in order to facilitate its incorporation into the organic materials and—when using silanes with polymerisable double bonds—to achieve a certain bonding between the organic matrix and the inorganic filler, so that later shrinkage or cracking during the final curing by radical-induced polymerisation can largely be avoided. A particularly preferred silane is γ-methacryloxypropyl-trimethoxysilane. Other suitable silanes are those with hydroxyl, amino, and epoxide groups.

It is important to take into account when producing the particle or fibre-reinforced PU material that the inorganic filler that might have been added may contain surface groups taking part in the reaction. Thus, silicic acids have silanol surface groups Si—OH that can react with isocyanate groups. Therefore, when adjusting the OH:NCO ratio of the starting components one must account for the amount of such groups present on the inorganic filler.

Suitable inert organic fillers are in particular the acrylic and methacrylic polymers, for instance polymethyl methacrylate, and the polyurethanes. These polymerisates are reduced to the desired particle size by grinding.

The following examples are cited in order to further explain the invention, but shall in no way limit the scope of the invention.

EXAMPLE No. 1

A solution of 47 g bis(methacryloxy-2-hydroxypropyl) sebacate, 32 g tris(6-iso-cyanatohexyl)biuret and 0.1 g dibutyltin diacetate are placed into a reaction vessel and homogeneously mixed. The mixing may be performed in vacuum in order to avoid the inclusion of air.

The mixture is cast into plate moulds or diverse other moulds, and subjected to the urethane reaction during a time of 60 min at 50° C. According to DSC, a double-bond content of 1.6 mmole/g of the organic substance is obtained. The resulting elastic plates, films, or moulded bodies can be left as is, or at any later time subjected to further processing for instance by cutting, drilling, rolling, pressing, bending, abrading, milling, etc. and at the same time or right afterwards definitely cured to stable, high-strength moulded bodies by radical polymerisation of the reactive, bound double bonds brought about by heating during 60 min to 100° C.

EXAMPLE No. 2

In a modification of example No. 1, 51 g bis(methacryloxy-2-hydroxypropyl) adipate, 39 g tris(6-isocyanatohexyl) biuret and 0.1 g dibutyltin diacetate are homogenised. According to DSC, a double-bond share of 1.8 mmole per gramme of organic substance is obtained.

EXAMPLE No. 3

In a modification of example No. 1, 44 g bis(methacryloxy-2-hydroxypropyl) succinate, 36 g tris(6-isocyanatohexyl)biuret and 0.1 g dibutyltin diacetate are homogenised. According to DSC, a double-bond share of 2.0 mmole per gramme of organic substance is obtained.

The following Table 1 provides an overview of the mechanical strengths of the different PU materials produced according to examples No. 1 to No. 3, and hot-cured at a temperature of 120° C. and a pressure of 6 bar:

TABLE 1

| | Starting mixture according to | | |
|---|---|---|---|
| | Example No. 1 | Example No. 2 | Example No. 3 |
| Flexural strength [MPa] | 67 ± 4 | 74 ± 14 | 86 ± 18 |
| Elastic modulus [MPa] | 1753 ± 231 | 2097 ± 212 | 2442 ± 80 |
| Surface fibre extension [%] | 7.4 ± 1.0 | 6.23 ± 3.16 | 6.0 ± 2.8 |

EXAMPLE No. 4

As a modification of examples No. 1 to 3, 1% by weight of dibenzoyl peroxide is added to the mixture and the mixture then homogenised. The duration of subsequent radical polymerisation at 120° C. is shortened to 2–10 min by addition of the catalyst. Optionally, it is possible owing to the catalyst addition to cure at temperatures far below 100° C., and particularly at temperatures in the range of 50 to 80° C.

By pressing, rolling, extruding or deep-drawing, the PU material resulting from the polyaddition is produced in the form of films of different thickness. Several of these films are brought in contact with each other, for instance piled up in layers or glued together with an adhesion promoter (for instance, wetting with acrylate monomer), compressed with pressures of about 2 to 10 bar, and bonded together and definitely cured to composites or laminates by heating to preferably about 100 to 150° C., and particularly 105 to 120° C., the individual layers being inseparably bonded together by chemical reactions without forming visible interfaces. By adding coloured pigments to one or several of these films one can generate any desired colour pattern or signal pattern. This process can basically be used with all preforms according to the invention which have not yet definitely been cured by radical polymerisation, so that any desired moulded composite body can be produced.

EXAMPLE No. 5

As a modification of examples No. 1 to 3, 0.3% by weight of D,L-camphorquinone and 0.5 weight percent of cyanoethylmethylaniline (CEMA) are added to the mixture and the mixture is then homogenised. The homogenised mass is cast into plate moulds, pressed to plates or extruded or deep-drawn to films while adjusting to layer thicknesses of 0.1 to 5 mm. After a reaction time of 60 min at 50° C. the crystal clear, flexible plastic films or plates are withdrawn.

a) From the plates or films having a layer thickness of 0.1 to 1 mm, fingernail shapes are punched out, placed onto the natural fingernails of a test person or glued on with the aid of an adhesion promoter (adhesive), when necessary precisely adjusted to the finger shape with fingernail scissors or other scissors, and cured within 90 s with the aid of a photopolymerisation device having an optical spectrum of 400–500 nm. Other objects, for instance orthopaedic insoles, other orthopaedic support elements, decorative articles etc. can be produced in an analogous manner.

b) The film of 1 mm thickness is cut into tapes about 100 mm wide and about 200 to 500 mm long. These tapes are wound around the ends of any two abutting plastic or metal pipes in such a way that they assure two-sided overlap (overlap on the right and left side) of the pipe ends of at least 40 mm, and exactly match or slightly exceed the pipe's contour. The tapes when fixed in this position are then cured within 1 to 10 min by external irradiation with a blue or UV lamp or by simultaneous heating and irradiation with light in a blue light/UV oven. In this way hard, stable gaskets or sleeves are produced, which when using the joint effects of heat and light will in addition yield a water-tight joint at the pipe ends.

c) The film of 5 mm thickness is divided into several parts and treated with textured rollers and presses having different surface patterns. The resulting embossments are fixed in their shapes and definitely cured by simultaneous heating to temperatures of 100 to 120° C. and/or by UV or blue-light irradiation. Decorative or other articles produced in this or similar ways can be further processed by painting, abrading, milling, scratching, etching, etc., both prior to and after the curing.

EXAMPLE No. 6

As a modification of examples No. 1 and 5, 20% by weight of silylated silica having a mean primary particle size of 40 nm (AEROSIL® OX-50 of Degussa) are added to the mixture and the mixture then homogenised to the largest possible extent.

a) Heat curing (as in example No. 1): the pasty, still flowable mass is then cast into different moulds and subjected to the urethane reaction during 1 h in a heating cabinet at 50° C. The resulting moulded bodies (in this case simple geometric shapes such as cubes, bricks, balls, tetrahedrons, cylinders, stars, animal figures, and simple testing profiles) are still elastic despite the high filler fraction. These moulded bodies can be left as is if so desired, or at any later time subjected to further treatment for instance by pressing, rolling, bending, abrading, cutting, drilling, milling, scraping, etc. and definitely cured by radical polymerisation, for instance 60 min hot curing at 100° C., either simultaneously or subsequently, to yield stable, high-strength moulded bodies. Hot curing can be performed both in a traditional (hot-air) oven or in a microwave device at wavelengths of about 1 to 1000 mm.

b) As an alternative or complement, photocuring can also be performed by irradiation with a UV or blue light source, provided a photocatalyst had been added to the starting mixture, as described in example No. 5.

Of course, both the preforms or moulded bodies produced by nonradical-type poly-addition and the definitely cured moulded bodies can be painted or decorated with paints and varnishes.

EXAMPLE No. 7

As a modification of examples No. 1–5, the mixtures specified there are mixed with 5 to 80% by weight of glass fibres having a length of 0.2–2 mm (short staple fibres) and a thickness of 0.1–1 mm and further processed as in example No. 1. The fibre-reinforced films, ribbons or moulded bodies produced in different sizes and thicknesses according to this example are distinguished by having a high tensile strength and at the same time elasticity after polyaddition. After radical polymerisation, products having high values of mechanical and physical parameters such as compressive strength, flexural strength, elastic modulus etc. are obtained (see Table 2).

TABLE 2

Comparison of reinforced moulded bodies after definite curing by radical polymerisation at 120° C. and 6 bar; starting mixture of the reaction components as in example No. 1

|  | Flexural strength [MPa] | Elastic modulus [MPa] | Surface fibre extension [%] |
|---|---|---|---|
| 5 wt. % short-staple glass fibres, not silylated | 108.3 ± 14.3 | 2818 ± 491 | 4.41 ± 0.42 |
| Glass fabric soaked with Ex. No. 1 start. mixture | 266 ± 36 | 18669 ± 2434 | 3.59 ± 0.24 |

Moreover, when glass fibres and other fillers are incorporated, the shrinkage due to polymerisation which anyhow is already slight (for instance about 3% in examples No. 1 to 5) decreases to a fraction of this value.

EXAMPLE No. 8

In a modification of example No. 5, the given mixture is mixed together with 20% by weight of AEROSIL® OX-50 of Degussa, and heated to 50° C. and homogenised in a screw extruder. Instead of camphorquinone and CEMA, 0.5 weight percent of 2,4,6-trimethylenebenzoyldiphenylphosphinoxide are added as a photocatalyst.

At low pressure the mass is conveyed to an endless tape through a flat sheet die having an opening of 5 mm in height, then optionally rolled out to a thickness of 1–1.5 mm, and finally subjected over a period of 1 to 2 h at a temperature of 50° C. to the urethane reaction in a zone for further processing. The share of double bonds in the resulting fibre-reinforced PU plates, tapes or films and tissue is 1.6 to 2.0 mmole per gramme of the organic substance.

The fibre-reinforced films, tape, or ribbons produced according to this example in different sizes and thicknesses are distinguished by high elasticity. They can be brought into different fanciful-decorative or useful shapes by torsion, twisting and/or bending, and then cured within 1 to 5 min by irradiation with wavelengths of 300 to 500 nm, for instance in a photodevice having a light intensity of 18,000 lux. The curing can be accelerated or improved to a significant degree by simultaneous or subsequent heating to about 50 to 120° C. The resulting objects are distinguished by high shock resistance and fracture resistance.

EXAMPLE No. 9

In a modification of examples No. 1 to 5, a glass fabric is impregnated with the homogenised mixtures, and pressed to a thin layer. After polyaddition a nonsticky, readily mouldable impregnated tissue is obtained. High-strength moulded bodies or plates which for instance can be used as printed circuit boards in the electronics industry are obtained by piling up two or more layers of this tissue, optionally after wetting with short-chain acrylate or methacrylate monomer, and subsequent radical-type thermal and/or photopolymerisation under pressure. Where extremely high strengths are desired, silylated glass fibres can be used in particular.

By using unidirectional fibre strands rather than nonwoven or woven fibre fabric, and staggered superposition of the resulting impregnated layers, the composite or laminate can be optimised specifically with respect to the desired force vectors.

EXAMPLE No. 10

Comparison of the curing times for different curing methods of the polyurethane material:
 a) Without catalyst addition, radical polymerisation of the preforms should preferably be performed at temperatures of about 100 to 150° C. Here the reaction time is 10 (at 150° C.) to 60 min (at 100° C.).
 b) Heat curing of acrylate and methacrylate polyurethanes with suitable catalysts added:

TABLE 3

| | Temperature | | |
|---|---|---|---|
| Catalyst added | 80° C. | 100° C. | 120° C. |
| Dibenzoyl peroxide | 60–120 min | 5–15 min | 2–10 min |
| tert-Butyl peroctoate | 30–100 min | 5–10 min | 1–3 min |
| Benzopinacol | 24–72 h | 1–5 h | 3–10 min | c) Photocuring of acrylate and methacrylate polyurethanes with suitable catalysts added:

TABLE 4

| Light intensity: | 450 mW/cm² | 18,000 lux | 18,000 lux |
|---|---|---|---|
| Spectrum: | 400–500 nm | 400–500 nm | 300–500 nm |
| Camphorquinone | 20–120 s | 4–10 min | 3–5 min |
| 2,4,6-Trimethylenebenzoyl-diphenylphosphinoxide | n.d. | 2–15 min | 1–5 min |
| Benzil dimethyl ketal (Irgacure ® 651) | n.d. | n.d. | 3–10 min | n.d. = not determined

Definite curing with the aid of light strongly depends on the layer thickness of the polyurethane material, the coloration, and where applicable the amount of fibre materials and/or fillers present. Photocuring can be accelerated or improved with respect to the depth of curing and to surface hardness by amine additions (for instance tri-ethanolamine).

The hardness or physical strength of the moulded bodies can once more be raised to a significant degree by a simultaneous or subsequent heat treatment at temperatures of about 100–120° C. lasting 5–10 min.

Both for photocuring and for hot curing, catalysts commonly are added in amounts of up to 5% by weight, and particularly of about 0.1 to 1% by weight. In the present example the catalyst content in cases (b) and (c) is close to 1% by weight.

EXAMPLE No. 11

A rope of PU material 10 m long and with a diameter of 1 cm, made according to example No. 5, is helically twisted and brought to an approximate S-shape. The thus shaped preform is cured over a period of 10 min by photopolymerisation. One end of the crystal clear moulded body is then brought in direct contact with an incandescent lamp or halogen lamp that is darkened in all directions; this combination is placed into a dark room. When switching on the lamp the light of which cannot directly illuminate the room, the light is transported through the moulded PU body and distributed in the room. In similar fashion different PU materials and the moulded bodies that can be produced from them can be used to achieve fanciful luminous effects and decorative lighting.

EXAMPLE No. 12

For the production of particularly decorative moulded bodies, coloured pigments, for instance inorganic oxides such as iron oxide or titanium dioxide can be added prior to the polyaddition reaction to the original component mixture in concentrations of preferably between 0.1 and 5% by weight.

The invention claimed is:

1. Method for the production of a polyurethane moulded body comprising:
 (a) preparing a mixture of
  (i) isocyanate and
  (ii) unsaturated monomers having both reactive double bonds and hydroxyl groups,
 as starting components, wherein the monomers containing hydroxyl groups are used in a stoichiometric ratio or in less than the stoichiometric amount relative to isocyanate; and wherein at least one of the starting components is at least trifunctional with regard to NCO groups and the other one is at least difunctional with regard to OH groups, or at least one of the starting compounds is at least trifunctional with regard to the OH groups and the other one is at least difunctional with regard to the NCO groups;
 (b) subjecting the mixture to a polyaddition reaction that is not triggered by radicals thereby generating a crosslinked, flexible, radical-polymerisable polyurethane preform having a content of nonextractable, reactive double bonds—as determined by DSC—of at least 0.5 mmole/g;
 wherein said preform is free of extractable monomers with reactive double bonds;
 wherein the mixture before or during the polyaddition reaction is subjected to a shaping step;
 and wherein said preform is produced in a non-powder form and is not comminuted to a powder; and
 (c) curing the shaped crosslinked and flexible polyurethane preform by radical-triggered polymerisation of the reactive double bonds, yielding a cured shaped body having a polyurethane matrix.

2. The method of claim 1 wherein the mixture of starting components comprises (i) isocyanate and (ii) (meth)acrylate containing hydroxyl groups in a ratio of about 1:1 between the OH and NCO groups.

3. The method of claim 1 wherein the curing by radical-triggered polymerisation occurs without toxic emissions.

4. The method of claim 1 wherein the preform is produced in the shape of a film, tape, ribbon, cord, or strand.

5. The method of claim 1 wherein to the starting components at least one of the following components is added: a filler, a fibre material, a coloured pigment.

6. The method of claim 5 wherein the filler is added in a concentration of at most 80% by weight of the total weight of the polyurethane material.

7. Method according to claim 6, wherein the filler is added at a concentration of 20 to 75% by weight.

8. The method of claim 5 wherein the fibre material is present in the form of unidirectional fibre strands, woven or nonwoven fibre fabric.

9. The method of claim 8 wherein the fibre material prior to the polyaddition reaction is impregnated with a mixture of the starting components, and then moulded in the form of plates or film and subjected to the polyaddition reaction.

10. Method according to claim 5, wherein the fibre material is selected from the group consisting of glass fibres and carbon fibres.

11. The method of claim 1 wherein curing of the preform occurs by radical polymerisation of the free double bonds while applying at least one measure selected from the group consisting of elevated pressure, elevated temperature, irradiation with microwaves, irradiation with blue light, irradiation with UV light, and ionizing radiation.

12. The method of claim 11 wherein the curing of the preform is carried out applying at least one condition or measure selected from the group consisting of a pressure of 2 to 10 bar, a temperature of 80 to 150° C., irradiation with light having a wavelength of 300 to 500 nm, and irradiation with microwaves having a wavelength of 1 to 1000 mm.

13. The method of claim 1 wherein to the mixture of starting components at least one catalyst for triggering and/or accelerating a radical induced polymerisation of the reactive double bonds is added in an amount of up to 5% by weight of the starting mixture.

14. Method according to claim 13, wherein the catalyst is a hot-curing catalyst or a photocatalyst.

15. Method according to claim 13, wherein the catalyst is added in an amount of 0.1 to 1% by weight.

16. The method of claim 1 wherein two or more preforms are bonded together while applying elevated pressure and elevated temperature to yield composites or laminates and cured.

17. Method according to claim 16, wherein the preforms are in the form of films, tapes, ribbons, or plates.

18. Method according to claim 16, wherein the preforms are piled up as layers or glued together with the aid of an adhesion promoter.

19. Method according to claim 16, wherein the bonded preforms are cured with the aid of light.

20. The method of claim 16 wherein fibre material is inserted between the preforms prior to definite curing by radical polymerisation.

21. Method according to claim 20, wherein the fibre material is in the form of woven or nonwoven fibre fabric.

22. The method of claim 1 wherein the moulded body is selected from the group consisting of toys, utensils, art objects, decorative objects, articles for medical and dental applications, and elements for technical purposes in civil engineering and mechanical design, said elements for technical purposes being selected from the group consisting of pipe connections, ways, borders, sheathing, mounting supports, sound, heat and electrical insulations, structural elements, components, casts of objects, moulds, optical wave guides, tool components, covers, and protective films.

23. The method of claim 1 wherein the preform is elastic.

24. The method of claim 1 wherein the monomers comprise (meth)acrylate that contains hydroxyl groups.

25. The method of claim 1 wherein curing of the preform via radical polymerisation is accomplished during or after a further step of mechanical forming other than comminuting to a powder of the preform.

26. The method of claim 25 wherein said further step of mechanical forming of the preform is accomplished without removal of material.

27. The method of claim 25 wherein said further step of mechanical forming of the preform comprises at least one action selected from the group consisting of bending, twisting, pressing, rolling, and deep-drawing.

28. Method according to claim 1, wherein the monomers with reactive double bonds comprise at least one compound selected from the group consisting of acrylate and methacrylate.

29. Method according to claim 1, wherein the shaping step comprises at least one method selected from the group consisting of casting, pressing, rolling, extruding, deep-drawing, and foaming.

30. Method according to claim 1, wherein the preform is elastic.

31. Method according to claim 1, wherein the preform is cured after a further forming step other than comminuting to a powder.

32. Method according to claim 31, wherein the further forming step is accomplished without removal of material.

33. Method according to claim 31, wherein the further forming step is selected from the group consisting of bending, twisting, pressing, rolling, deep-drawing, cutting, carving, grinding, and scraping.

34. A polyurethane moulded body prepared by a process comprising:
 (a) preparing a mixture of
  (i) isocyanate and
  (ii) unsaturated monomers having both reactive double bonds and hydroxyl groups,
 as starting components, wherein the monomers containing hydroxyl groups are used in a stoichiometric ratio or in less than the stoichiometric amount relative to isocyanate; wherein at least one of the starting components is at least trifunctional with regard to NCO groups and the other one is at least difunctional with regard to OH groups, or at least one of the starting materials is at least trifunctional with regard to the OH groups and the other one is at least difunctional with regard to the NCO groups;
 (b) subjecting the mixture to a polyaddition reaction that is not triggered by radicals thereby generating a crosslinked, flexible, radical-polymerisable polyurethane preform having a content of nonextractable, reactive double bonds—as determined by DSC—of at least 0.5 mmole/g;
 wherein said preform is free of extractable monomers with reactive double bonds;
 wherein the mixture before or during the polyaddition reaction is subjected to a shaping step;
 and wherein said preform is produced in a non-powder form and is not comminuted to a powder; and
 (c) curing the shaped crosslinked and flexible polyurethane preform by radical-triggered polymerisation of the reactive double bonds, yielding a cured shaped body having a polyurethane matrix.

35. The moulded body of claim 34, characterised in that it is of a nature selected from the group consisting of colourless, translucent, air permeable, and foamed.

36. The moulded body of claim 34, characterised in that it contains at least one additive selected from the group consisting of a filler, fibre material, and coloured pigment.

37. The moulded body of claim 34, characterised in that it is present as a composite or laminate formed from at least two curable preforms.

38. Moulded body according to claim 34, wherein the monomers comprise (meth)acrylate containing hydroxyl groups.

39. Moulded body according to claim 34, wherein the polyurethane matrix contains additives.

40. Moulded body according to claim 34, which exhibits a surface treatment selected from the group consisting of coloration, painting, and texturing.

41. A method for the production of a foamed polyurethane moulded body comprising:
- (a) preparing a mixture of
  - (i) isocyanate and
  - (ii) unsaturated monomers having both reactive double bonds and hydroxyl groups, as starting components, wherein the monomers containing hydroxyl groups are used in a stoichiometric ratio or in less than the stoichiometric amount relative to isocyanate; and wherein at least one of the starting components is at least trifunctional with regard to NCO groups and the other one is at least difunctional with regard to OH groups, or at least one of the starting components is at least trifunctional with regard to the OH groups and the other one is at least difunctional with regard to the NCO groups;
- (b) subjecting the mixture to a polyaddition reaction that is not triggered by radicals thereby generating a crosslinked, flexible, radical-polymerisable polyurethane preform having a content of nonextractable, reactive double bonds—as determined by DSC—of at least 0.5 mmole/g;

wherein said preform is free of extractable monomers with reactive double bonds and silicon dioxide;

wherein the mixture before or during the polyaddition reaction is subjected to a shaping step;

and wherein said preform is produced in a non-powder, foamed form and is not comminuted to a powder; and
- (c) curing the foamed polyurethane preform by radical-triggered polymerisation of the reactive double bonds, yielding a cured foamed body having a polyurethane matrix.

42. A polyurethane moulded body prepared by a process comprising:
- (a) preparing a mixture of
  - (i) isocyanate and
  - (ii) unsaturated monomers having both reactive double bonds and hydroxyl groups, as starting components wherein at least one of the starting components is at least trifunctional with regard to NCO groups and the other one is at least difunctional with regard to OH groups, or at least one of the starting components is at least trifunctional with regard to the OH groups and the other one is at least difunctional with regard to the NCO groups;
- (b) subjecting the mixture to a polyaddition reaction that is not triggered by radicals thereby generating a crosslinked, flexible, radical-polymerisable polyurethane preform having a content of nonextractable, reactive double bonds—as determined by DSC—of at least 0.5 mmole/g;

wherein the mixture before or during the polyaddition reaction is subjected to a shaping step;

and wherein said preform is produced in a non-powder, foamed form and is not comminuted to a powder; and
- (c) curing the foamed crosslinked and flexible polyurethane preform by radical-triggered polymerization of the reactive double bonds, yielding a cured foamed body having a polyurethane matrix.

* * * * *